(12) United States Patent
Shimada et al.

(10) Patent No.: US 12,536,091 B2
(45) Date of Patent: Jan. 27, 2026

(54) PROGRAM ANALYSIS APPARATUS, PROGRAM ANALYSIS METHOD, AND NON-TRANSITORY COMPUTER READABLE MEDIUM STORING PROGRAM

(71) Applicant: NEC Corporation, Tokyo (JP)

(72) Inventors: Yusuke Shimada, Tokyo (JP); Norio Yamagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 309 days.

(21) Appl. No.: 18/267,684

(22) PCT Filed: Mar. 23, 2021

(86) PCT No.: PCT/JP2021/012048
§ 371 (c)(1),
(2) Date: Jun. 15, 2023

(87) PCT Pub. No.: WO2022/201324
PCT Pub. Date: Sep. 29, 2022

(65) Prior Publication Data
US 2024/0037010 A1    Feb. 1, 2024

(51) Int. Cl.
*G06F 11/3604*    (2025.01)
(52) U.S. Cl.
CPC ................. *G06F 11/3604* (2013.01)
(58) Field of Classification Search
None
See application file for complete search history.

(56) References Cited

U.S. PATENT DOCUMENTS

| 9,921,942 | B1 * | 3/2018 | Makohon | ............ G06F 16/285 |
| 2017/0286690 | A1 * | 10/2017 | Chari | ................. H04L 63/1433 |
| 2019/0220596 | A1 | 7/2019 | Lie et al. | |

FOREIGN PATENT DOCUMENTS

| WO | 2020/240830 A1 | 12/2020 |
| WO | 2021/038705 A1 | 3/2021 |

OTHER PUBLICATIONS

International Search Report for PCT Application No. PCT/JP2021/012048, mailed on Jun. 22, 2021.
Sam L. Thomas, Tom Chothia, and Flavio D. Garcia, "Stringer: Measuring the Importance of Static Data Comparisons to Detect Backdoors and Undocumented Functionality", Computer Security ESORICS 2017, pp. 513-531, Aug. 12, 2017.

\* cited by examiner

*Primary Examiner* — Duy Khuong T Nguyen
*Assistant Examiner* — Mark A Gooray

(57) ABSTRACT

A program analysis apparatus includes a first code block extraction means for extracting a first code block having a specific property from codes included in a binary of a program, a second code block extraction means for extracting a second code block performing a predetermined sensitive operation from the codes included in the binary of the program, a relationship information acquisition means for acquiring relationship information indicating a relationship on a control flow between the first code block and the second code block, a backdoor score calculation means for calculating a backdoor score based on content of the predetermined sensitive operation in the first code block and performing addition and subtraction of the backdoor score with respect to the first code block based on the relationship information, and an output means for outputting the first code block and the backdoor score for the first code block.

9 Claims, 15 Drawing Sheets

PROGRAM ANALYSIS APPARATUS, PROGRAM ANALYSIS METHOD, AND NON-TRANSITORY COMPUTER READABLE MEDIUM STORING PROGRAM

This application is a National Stage Entry of PCT/JP2021/012048 filed on Mar. 23, 2021, the contents of all of which are incorporated herein by reference, in their entirety.

TECHNICAL FIELD

The present disclosure relates to a program analysis apparatus, a program analysis method, and a non-transitory computer readable medium storing a program.

BACKGROUND ART

In recent years, infrastructure and company systems have become complicated. Therefore, the infrastructure and the company system are generally constructed not only by devices and software of a single company but also by procuring devices and software of various companies from the outside and combining them.

However, many cases have been reported in which a backdoor is found in software (or firmware) or hardware procured from an external manufacturer. The "backdoor" referred to in the present specification can be defined as, for example, a function that is incorporated as a part of a program including a plurality of functions constituting software and is not notified to a user and is not desired by the user.

Therefore, a manufacturer who coordinates construction of an infrastructure or a company system needs to inspect whether a backdoor is included in a program constituting software procured from an external manufacturer.

For example, Non-Patent Literature 1 describes extracting a candidate for a backdoor code by scoring a code included in a binary to be inspected. Here, in Non-Patent Literature 1, a function for comparing static data is specified from the codes included in the target binary, and scoring is performed on how much a comparison result by the specified function affects the subsequent execution path, thereby extracting the candidate for the backdoor code.

CITATION LIST

Non Patent Literature

Non Patent Literature 1: Sam L. Thomas, Tom Chothia, and Flavio D. Garcia, "Stringer: Measuring the Importance of Static Data Comparisons to Detect Backdoors and Undocumented Functionality", Computer Security ESORICS 2017, pp. 513-531

SUMMARY OF INVENTION

Technical Problem

However, in Non-Patent Literature 1, since the scoring target is limited to some backdoor types, there is a problem that the scoring target cannot be applied to inspection of other backdoor types.

The present disclosure has been made to solve such a problem, and an object of the present disclosure is to provide a program analysis apparatus, a program analysis method, and a non-transitory computer readable medium storing a program that can be used for various backdoor type inspections.

Solution to Problem

According to a first aspect of the present disclosure, there is provided a program analysis apparatus including: a first code block extraction means for extracting a first code block which is a code block having a specific property from codes included in a binary of a program; a second code block extraction means for extracting a second code block which is a code block performing a predetermined sensitive operation from the codes included in the binary of the program; a relationship information acquisition means for acquiring relationship information indicating a relationship on a control flow between the first code block and the second code block; a backdoor score calculation means for calculating a backdoor score which is a score indicating a possibility that the first code block is a backdoor code or a score indicating a magnitude of an influence on a system when the first code block is executed based on content of the predetermined sensitive operation in the first code block, and performing addition and subtraction of the backdoor score with respect to the first code block based on the relationship information acquired by the relationship information acquisition means; and an output means for outputting the first code block extracted by the first code block extraction means and the backdoor score for the first code block calculated by the backdoor score calculation means.

According to a second aspect of the present disclosure, there is provided a program analysis method executed by a program analysis apparatus, the program analysis method including: a first code block extraction step of extracting a first code block which is a code block having a specific property from codes included in a binary of a program; a second code block extraction step of extracting a second code block which is a code block performing a predetermined sensitive operation from the codes included in the binary of the program; a relationship information acquisition step of acquiring relationship information indicating a relationship on a control flow between the first code block and the second code block; a score calculation step of calculating a backdoor score which is a score indicating a possibility that the first code block is a backdoor code or a score indicating a magnitude of an influence on a system when the first code block is executed based on content of the predetermined sensitive operation in the first code block, and performing addition and subtraction of the backdoor score with respect to the first code block based on the acquired relationship information; and an output step of outputting the first code block extracted in the first code block extraction step and the backdoor score for the first code block calculated in the score calculation step.

According to a third aspect of the present disclosure, a non-transitory computer readable medium storing a program for causing a computer to execute: a first code block extraction process of extracting a first code block which is a code block having a specific property from codes included in a binary of a program; a second code block extraction process of extracting a second code block which is a code block performing a predetermined sensitive operation from the codes included in the binary of the program; a relationship information acquisition process of acquiring relationship information indicating a relationship on a control flow between the first code block and the second code block; a score calculation process of calculating a backdoor score which is a score indicating a possibility that the first code block is a backdoor code or a score indicating a magnitude of an influence on a system when the first code block is executed based on content of the predetermined sensitive operation in the first code block, and performing addition and subtraction of the backdoor score with respect to the first code block based on the acquired relationship information; and an output process of outputting the first code block extracted in the first code block extraction process and the backdoor score for the first code block calculated in the score calculation process.

Advantageous Effects of Invention

According to the present disclosure, it is possible to provide a program analysis apparatus, a program analysis method, and a non-transitory computer readable medium storing a program, which can be used for various backdoor type inspections.

EXAMPLE EMBODIMENT

Figure 1:
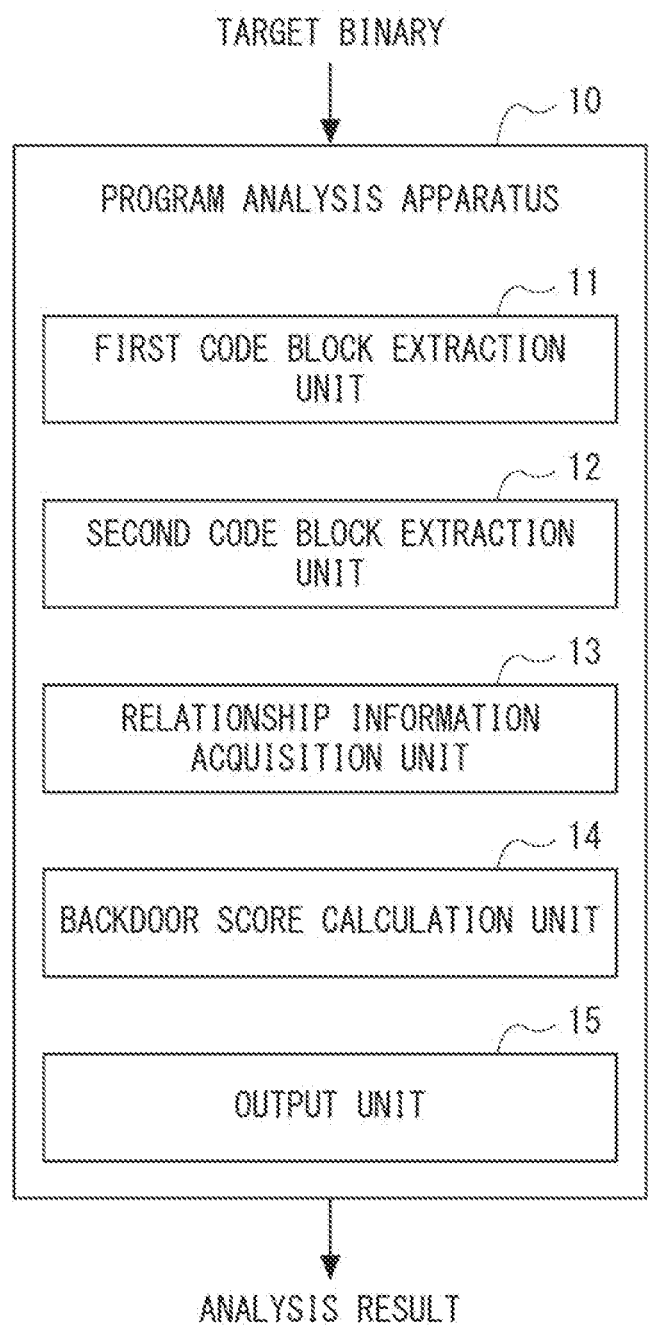
FIG. 1 is a block diagram illustrating a configuration example of a program analysis apparatus according to a first example embodiment.

Hereinafter, example embodiments will be described with reference to the drawings. In the example embodiments, the same or equivalent elements are denoted by the same reference numerals, and repeated description will be omitted.

<Preliminary Examination by Inventor>

Before describing a program analysis apparatus according to a first example embodiment, contents examined in advance by the inventor will be described.

Figure 14:
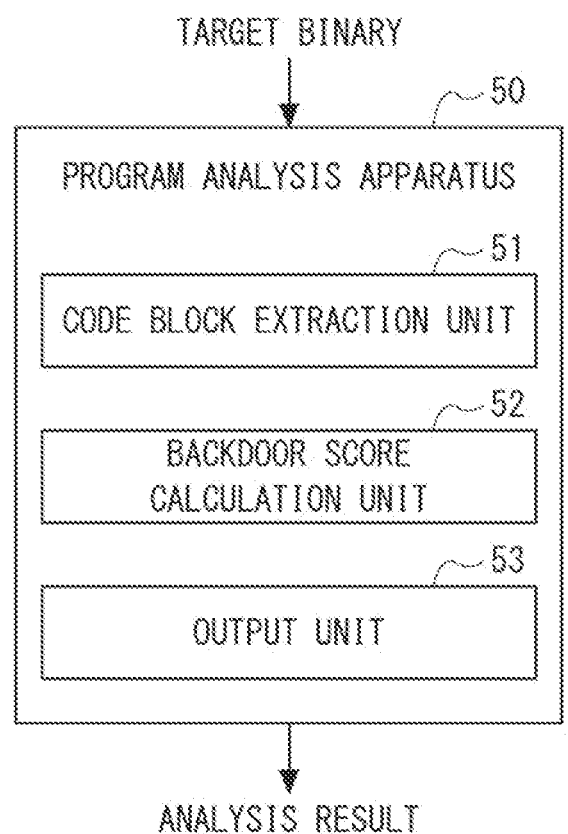
FIG. 14 is a block diagram illustrating a configuration example of a program analysis apparatus at a concept stage.

FIG. 14 is a block diagram illustrating a configuration example of a program analysis apparatus 50 at a concept stage before reaching the first example embodiment. As illustrated in FIG. 14, the program analysis apparatus 50 includes a code block extraction unit 51, a backdoor score calculation unit 52, and an output unit 53.

The code block extraction unit 51 extracts all code blocks having specific properties from codes included in a binary (hereinafter, referred to as a target binary) of a program to be analyzed. The code block described herein indicates, for example, a code group in a functional unit or a basic block unit in a program. The code block having a specific property is, for example, a dead code block. The dead code block is a code block that cannot be reached by a normal control flow when a program is executed.

The backdoor score calculation unit 52 calculates, for each code block extracted by the code block extraction unit 51, a backdoor score that is a score indicating a possibility that the code block is a backdoor code, a score indicating the magnitude of the influence on the system when the code block is executed, or the like based on an operation content of the code block. The system described herein is, for example, a computer including an environment in which a program to be analyzed is executed.

For example, in a case where a predetermined sensitive operation exists in the code block extracted by the code block extraction unit 51, the backdoor score calculation unit 52 performs a process of adding a score set in advance for the operation to the backdoor score for the code block. The predetermined sensitive operation described herein is, for example, an operation that is considered to significantly affect a program or a system including an environment in which the program is executed when the predetermined sensitive operation is illegally executed, and is an operation determined in advance by a user (for example, a requester who requests an inspection of the program, an analyst who performs the inspection, and the like).

The output unit 53 outputs the code block extracted by the code block extraction unit 51 and the backdoor score for the code block calculated by the backdoor score calculation unit 52 as analysis results.

As described above, the program analysis apparatus 50 can present the code block that is a candidate for the backdoor code included in the program to be analyzed and the backdoor score for the code block to the analyst of the program, for example. Therefore, the analyst of the program can extract the candidate for the backdoor code from the program without comparing the code of the program to be analyzed with the specification or manually checking the code of the program. Unlike the related art, the program analysis apparatus 50 can be used for inspection of various backdoor types.

Figure 15:
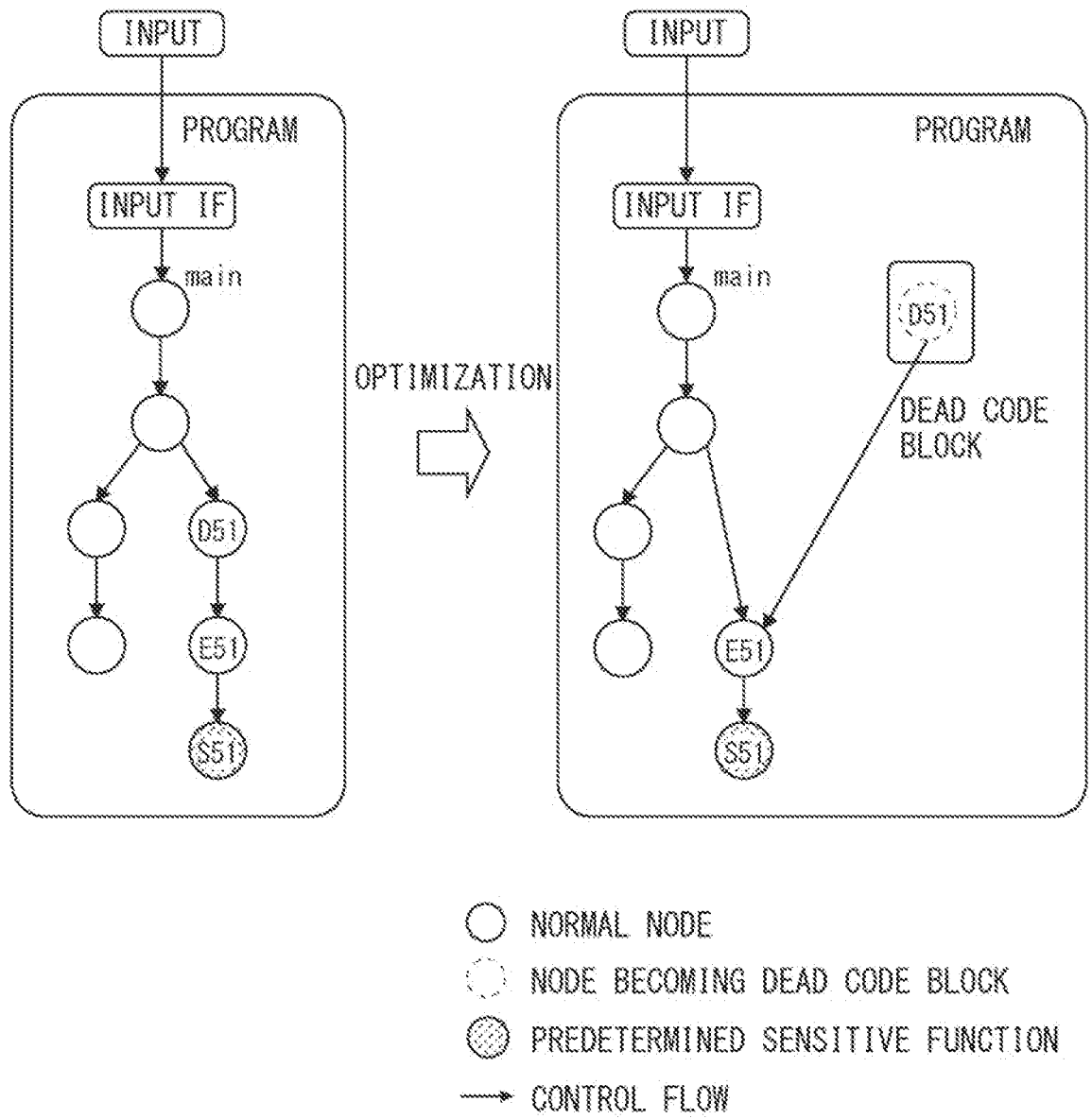
FIG. 15 is a schematic diagram describing an apparent dead code block generated by optimization of a program.

Incidentally, a system call function used for scoring exists in units of several hundreds in the program. Therefore, the number of code blocks that call such a system call function, that is, code blocks that perform a predetermined sensitive operation also tends to increase. In addition, as a result of the inline conversion of the function by the optimization of the program by a compiler, the number of dead codes that are apparently dead codes but are less likely to be backdoor codes increases. Referring to an example of a control flow graph of FIG. 15, a node D51 included in a normal flow before the optimization deviates from the normal flow and becomes a dead code after the optimization. In FIG. 15, a solid circle represents the normal node, a broken circle represents a node serving as the dead code block, and an arrow represents the control flow. For these reasons, the number of dead codes connected to the code performing the predetermined sensitive operation is also increased.

However, the program analysis apparatus 50 calculates the backdoor score even for the dead code having a low possibility of being the backdoor code as described above under the same condition as the other dead codes without distinguishing the dead code from the other dead codes. Therefore, there is a problem that the program analysis apparatus 50 cannot calculate a highly reliable backdoor score, and as a result, cannot accurately extract the code block having a high possibility of being the backdoor code.

Therefore, a program analysis apparatus 10 has been found that can accurately extract the code block having a high possibility of being the backdoor code by calculating the backdoor score having high reliability for each code block.

First Example Embodiment

FIG. 1 is a block diagram illustrating a configuration example of the program analysis apparatus 10 according to a first example embodiment. As illustrated in FIG. 1, the program analysis apparatus 10 includes a first code block extraction unit 11, a second code block extraction unit 12, a relationship information acquisition unit 13, and a backdoor score calculation unit 14.

The first code block extraction unit 11 extracts all code blocks having specific properties as first code blocks from codes included in a binary (hereinafter, referred to as a target binary) of a program to be analyzed. The code block described herein indicates, for example, a code group in a functional unit or a basic block unit in a program. The code block having a specific property is, for example, a dead code block. The dead code block is a code block that cannot be reached by a normal control flow when a program is executed.

The second code block extraction unit 12 extracts a code block performing a predetermined sensitive operation as a second code block from codes included in the target binary. As will be described in detail later, the predetermined sensitive operation described herein is, for example, an operation that is considered to have a serious influence on a program or a system including an environment in which the program is executed when the predetermined sensitive operation is illegally executed, and is an operation determined in advance by the user. The system is, for example, a computer including an environment in which a program to be analyzed is executed.

The relationship information acquisition unit 13 acquires relationship information indicating a relationship on the control flow between the first code block such as the dead code block and the second code block performing the predetermined sensitive operation.

For example, the relationship information acquisition unit 13 acquires a first code block having one or more second code blocks that perform a predetermined sensitive operation in a child node among the first code blocks as relationship information A1 that is information indicating a relationship with the one or more second code blocks. In addition, the relationship information acquisition unit 13 acquires, as relationship information A2 that is information indicating a relationship with one or more second code blocks, the first code block which has the one or more second code blocks that perform a predetermined sensitive operation in the child node among the first code blocks and in which all of the one or more second code blocks can be traced from a normal control flow (in other words, all of the one or more second code blocks are included in a plurality of code blocks constituting the normal control flow). The relationship information other than the relationship information A1 and A2 will be described later.

The backdoor score calculation unit 14 calculates, for each first code block extracted by the first code block extraction unit 11, a backdoor score that is a score indicating the possibility that the first code block is the backdoor code or a score indicating a magnitude of an influence on the system when the first code block is executed based on an operation content (content of predetermined sensitive operation) of the first code block.

Further, the backdoor score calculation unit 14 performs addition and subtraction of the backdoor score with respect to each first code block based on the relationship information acquired by the relationship information acquisition unit 13.

For example, in a case where the relationship information A1 is acquired by the relationship information acquisition unit 13, in other words, in a case where the first code block having one or more second code blocks for performing the predetermined sensitive operation in the child node is detected (acquired) by the relationship information acquisition unit 13, it is considered that there is a relatively high possibility that the detected first code block is the backdoor code. In this case, the backdoor score calculation unit 14 adds a score corresponding to the content of the predetermined sensitive operation included in the one or more second code blocks to the backdoor score for the detected first code block.

Furthermore, for example, in a case where the relationship information A2 described above is acquired by the relationship information acquisition unit 13, in other words, in a case where the relationship information acquisition unit 13 detects (acquires) the first code block which has one or more second code blocks that perform the predetermined sensitive operation in the child node and in which all of the one or more second code blocks can be traced from the normal control flow, there is a high possibility that the detected first code block is the dead code generated by the inline conversion of the function associated with optimization of a program, and thus, there is a low possibility that the first code block is the backdoor code. In this case, the backdoor score calculation unit 14 subtracts a predetermined score from the backdoor score for the detected first code block, for example.

The output unit 15 outputs the first code block extracted by the first code block extraction unit 11 and the backdoor score for the first code block calculated by the backdoor score calculation unit 14 as analysis results. At this time, for example, the output unit 15 can output the analysis result in a mode in which the backdoor score for the code block is assigned to the first code block.

Figure 2:
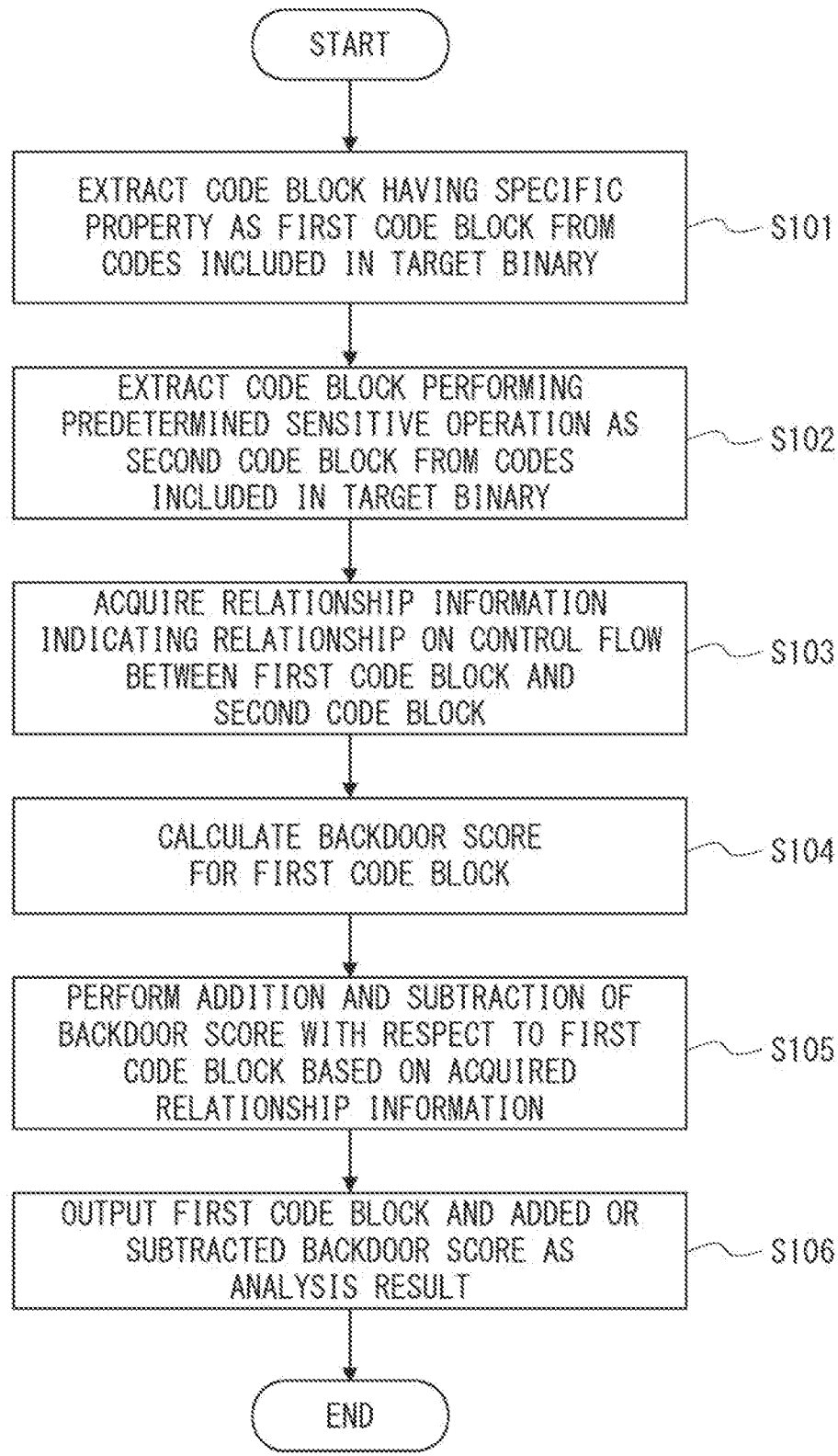
FIG. 2 is a flowchart illustrating an example of a flow of a process of the program analysis apparatus according to the first example embodiment.

Next, an example of a flow of a process of the program analysis apparatus 10 will be described with reference to FIG. 2. FIG. 2 is a flowchart illustrating an example of the flow of the process of the program analysis apparatus 10.

As illustrated in FIG. 2, first, the first code block extraction unit 11 extracts all code blocks having specific properties as first code blocks from codes included in the target binary (Step S101). Thereafter, the second code block extraction unit 12 extracts the code block performing the predetermined sensitive operation as the second code block from the codes included in the target binary (Step S102). Thereafter, the relationship information acquisition unit 13 acquires the relationship information indicating the relationship on the control flow between the first code block and the second code block (Step S103). Thereafter, the backdoor score calculation unit 14 calculates the backdoor score for each first code block extracted by the first code block extraction unit 11 based on the operation content (content of predetermined sensitive operation) of the first code block (Step S104). Further, the backdoor score calculation unit 14 performs addition and subtraction of the backdoor score with respect to each first code block based on the relationship information acquired by the relationship information acquisition unit 13 (Step S105). Thereafter, the output unit 15 outputs the first code block extracted by the first code block extraction unit 11 and the backdoor score for the first code block calculated by the backdoor score calculation unit 14 as the analysis results (Step S106).

As described above, the program analysis apparatus 10 according to the present example embodiment can present the first code block that is a candidate for the backdoor code included in the program to be analyzed and the backdoor score for the first code block, for example, to an analyst of the program. As a result, the analyst of the program can extract a candidate for the backdoor code from the program without comparing the code of the program to be analyzed with the specification or manually checking the code of the program.

Here, the program analysis apparatus 10 according to the present example embodiment calculates the backdoor score for each first code block in consideration of the relationship on the control flow between the first code block which is the code block having a specific property and the second code block which is the code block performing the predetermined sensitive operation. As a result, the program analysis apparatus 10 can lower the backdoor score for the first code block that is apparently the dead code but is less likely to be the backdoor code, for example, as a result of the inline conversion of the function by the optimization of the program by the compiler. That is, the program analysis apparatus 10 can calculate a backdoor score with higher reliability for each first code block. As a result, the analyst of the program can accurately extract the code block having a high possibility of being the backdoor code from the program.

Second Example Embodiment

Figure 3:
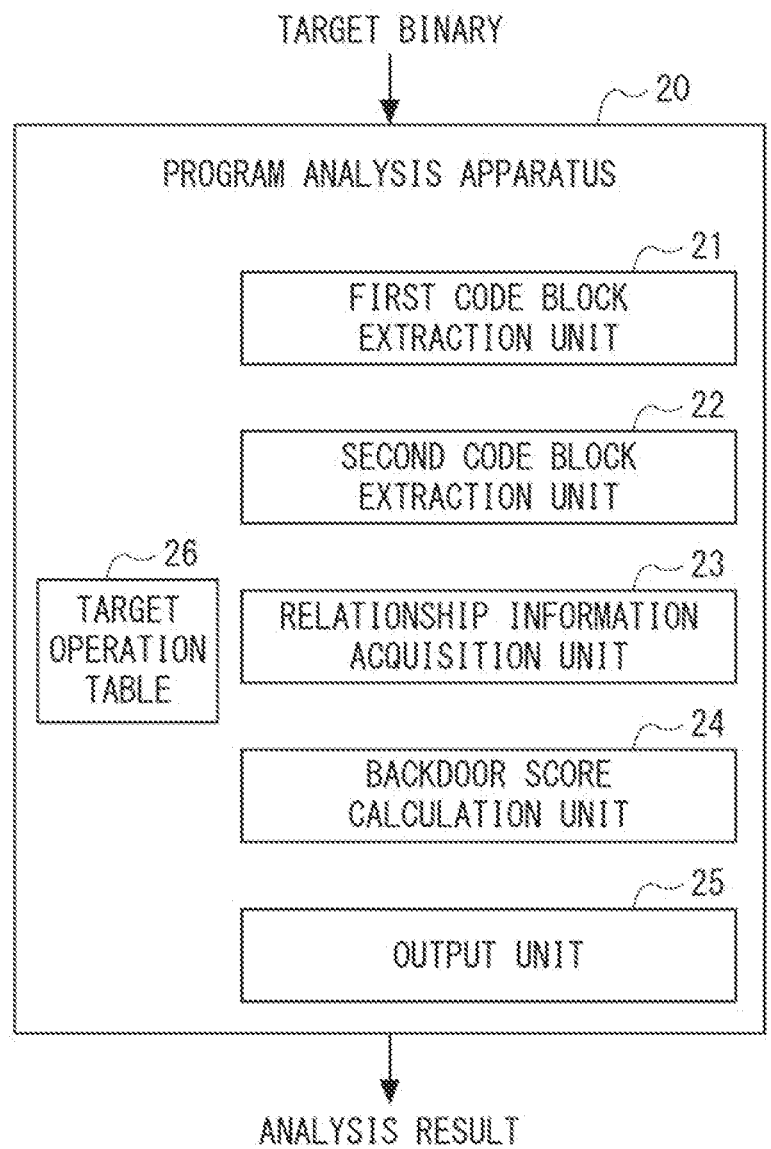
FIG. 3 is a block diagram illustrating a configuration example of a program analysis apparatus according to a second example embodiment.

FIG. 3 is a block diagram illustrating a configuration example of a program analysis apparatus 20 according to the second example embodiment. As illustrated in FIG. 3, the program analysis apparatus 20 includes a first code block extraction unit 21, a second code block extraction unit 22, a relationship information acquisition unit 23, a backdoor score calculation unit 24, an output unit 25, and a target operation table 26.

The first code block extraction unit 21 extracts all code blocks having specific properties as first code blocks from codes included in the target binary.

More specifically, the first code block extraction unit 21 performs static analysis or the like on the target binary to create a control flow graph of the entire program. Thereafter, the first code block extraction unit 21 extracts all code blocks having specific properties as the first code blocks from codes included in the target binary based on information such as the created control flow graph.

The code block having a specific property is, for example, a dead code block as described above. The dead code block is a code block that cannot be reached by a normal control flow when a program is executed.

Figure 4:
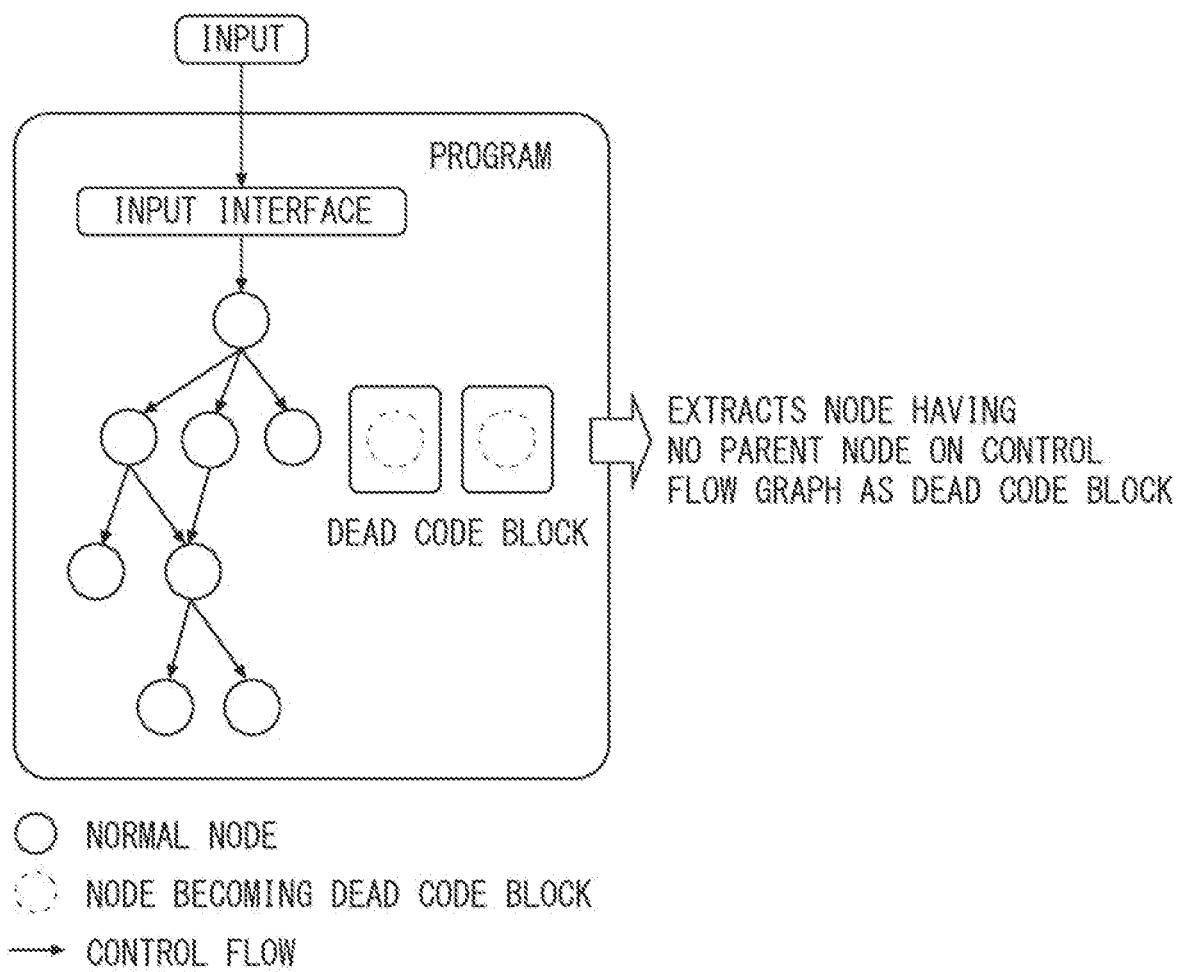
FIG. 4 is a schematic diagram illustrating an example of a control flow graph of a certain program for describing a dead code block which is an example of a code block having a specific property.
Figure 5:
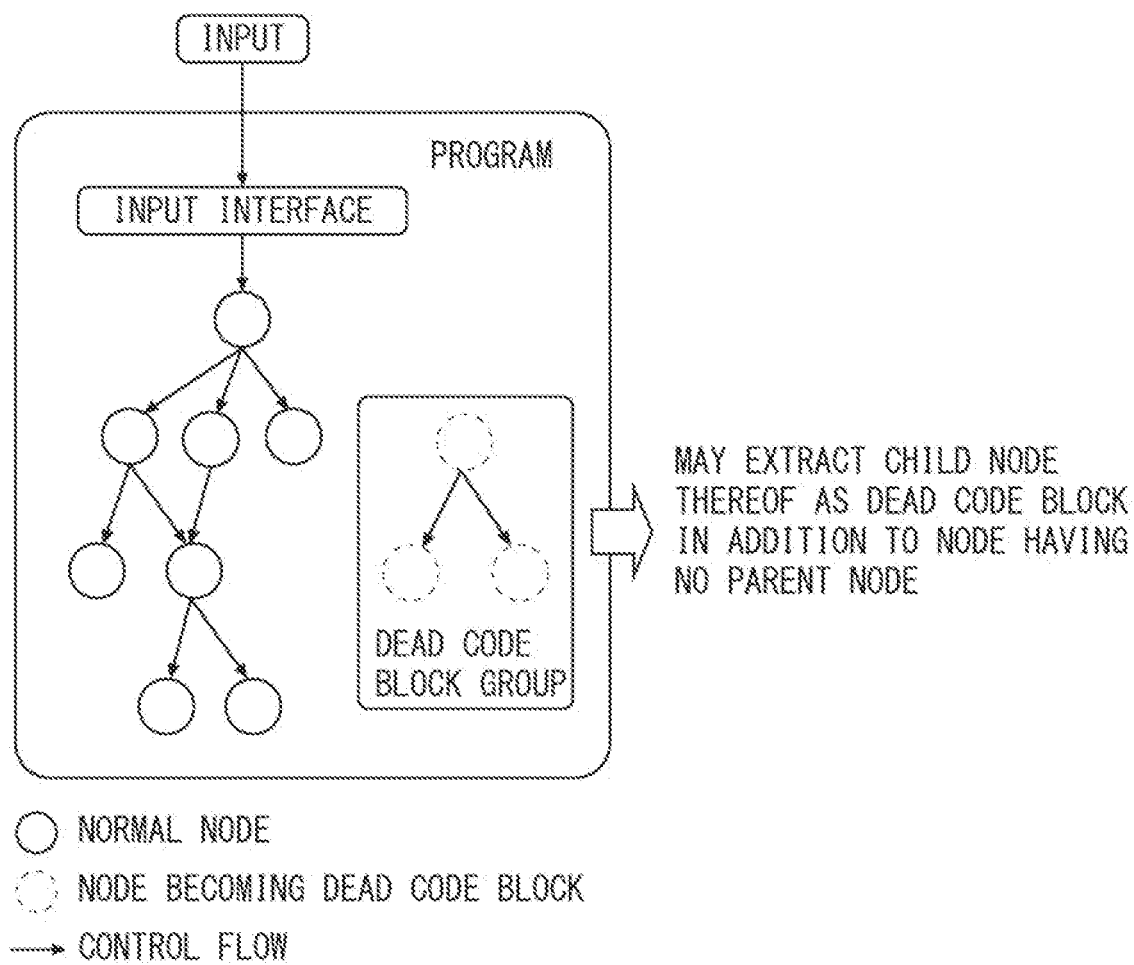
FIG. 5 is a schematic diagram illustrating an example of a control flow graph of a certain program for describing the dead code block which is an example of the code block having the specific property.

Here, an example of a method of extracting the dead code block will be described with reference to FIGS. 4 and 5. FIGS. 4 and 5 are schematic diagrams illustrating an example of a control flow graph of a certain program for describing the dead code block. In FIGS. 4 and 5, a solid circle represents a normal node, a broken circle represents a node serving as the dead code block, and an arrow represents a control flow (the same applies to FIGS. 6 and 7).

As illustrated in FIG. 4, the first code block extraction unit 21 extracts a node having no parent node on the control flow graph as the dead code block (that is, the first code block). In addition, as illustrated in FIG. 5, the first code block extraction unit 21 may extract a child node thereof as the dead code block (that is, the first code block) in addition to the node having no parent node on the control flow graph.

Figure 6:
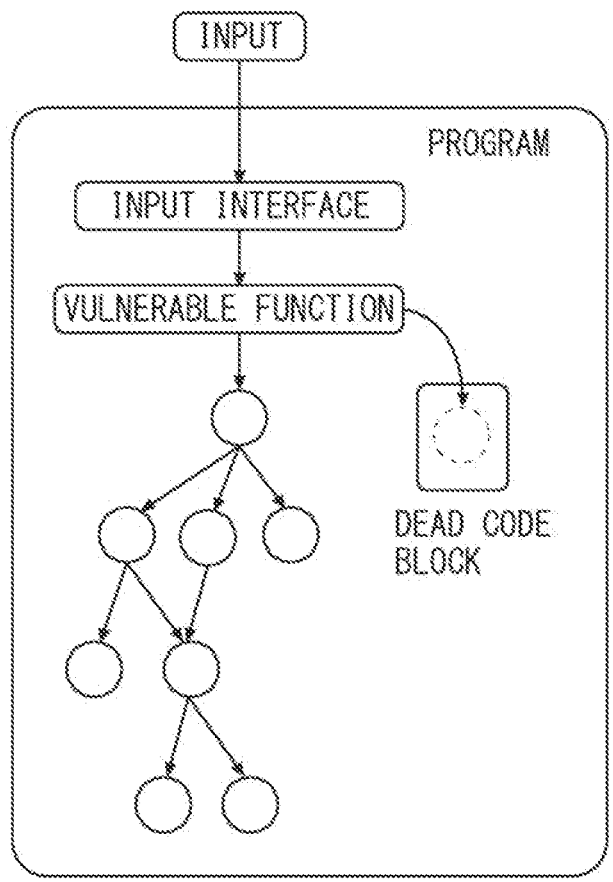
FIG. 6 is a schematic diagram illustrating an example of a control flow graph of a certain program for describing the dead code block which is an example of the code block having the specific property.

The dead code block described above is not executed as long as a normal input value to the program is given. However, as illustrated in FIG. 6, when there is a vulnerability in the program, the dead code block may be called and executed by the vulnerable function under a specific condition such as giving a special input value.

Figure 7:
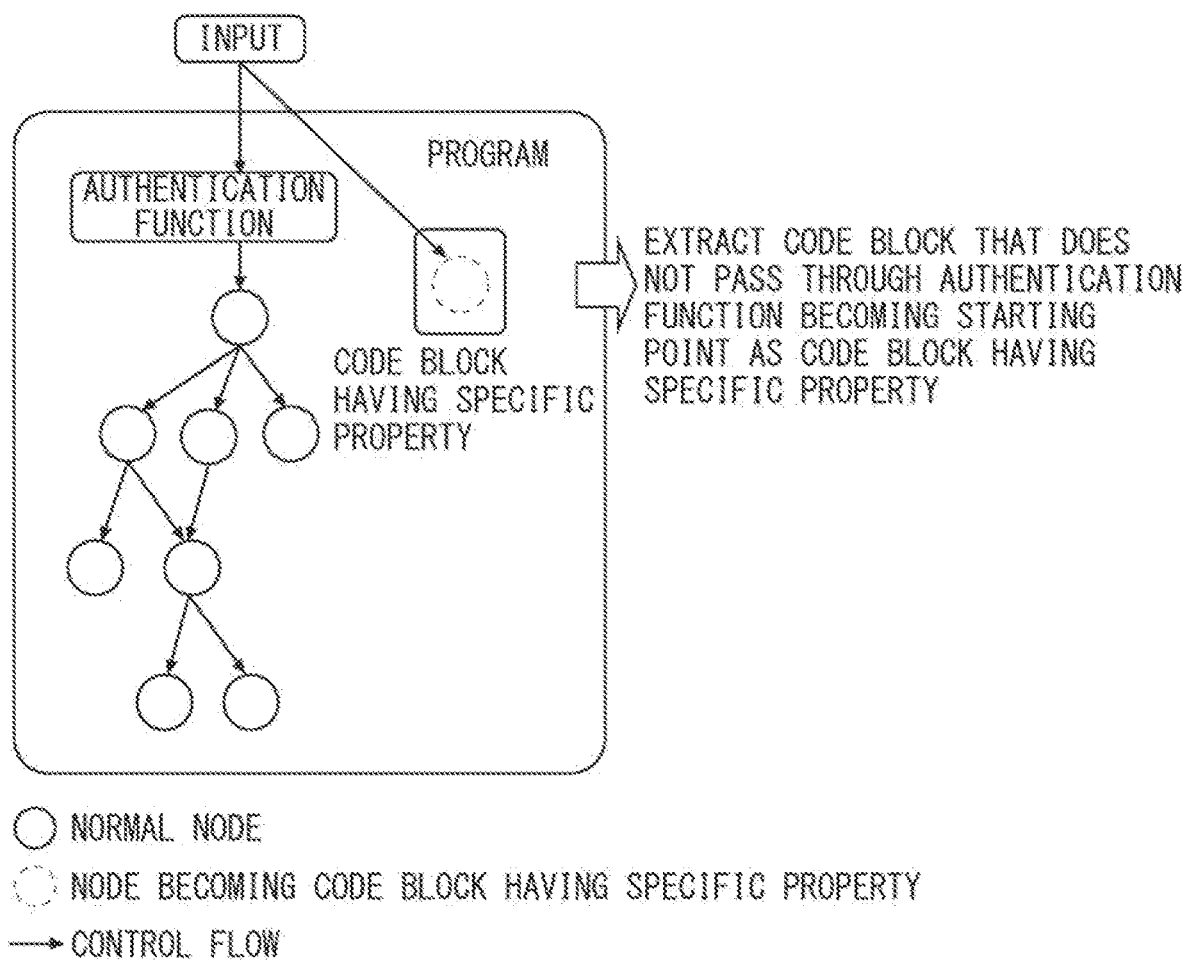
FIG. 7 is a schematic diagram illustrating an example of a control flow graph of a certain program for describing another example of the code block having the specific property.

Note that the code block having a specific property is not limited to the dead code block described above. For example, a code block that does not pass through a predetermined function, specifically, an authentication function, a parser function, or the like, which is a starting point that is always passed through in normal execution of a program, may be the code block having the specific property. In the example of FIG. 7, the authentication function as the starting point exists on the control flow. In this case, the first code block extraction unit 21 may extract the code block that does not pass through the authentication function as the code block having the specific property.

The second code block extraction unit 22 extracts the code block performing the predetermined sensitive operation as the second code block from codes included in the target binary.

As described above, the predetermined sensitive operation is, for example, an operation that is considered to significantly affect the program or the system including the environment in which the program is executed when the predetermined sensitive operation is illegally executed, and is the operation determined in advance by the user.

For example, the predetermined sensitive operation is at least one of the operation of calling a predetermined function, the operation of accessing a predetermined variable, and the operation of executing a predetermined command, which are predetermined by the user (for example, the requester who requests the inspection of the program, the analyst who performs the inspection, and the like). The operation of calling a predetermined function is an operation of calling at least one of a system call, a predetermined library function, and a predetermined application programming interface (API). The operation of accessing a predetermined variable is, for example, an operation of accessing a global variable of the program. These predetermined sensitive operations are stored in the target operation table 26 in advance by the user together with scores corresponding thereto.

The relationship information acquisition unit 23 acquires the relationship information indicating a relationship on the control flow between the first code block such as the dead code block and the second code block performing the predetermined sensitive operation.

For example, the relationship information acquisition unit 23 acquires the first code block having one or more second code blocks that perform the predetermined sensitive operation in the child node among the first code blocks as the relationship information A1 that is information indicating the relationship with the one or more second code blocks.

In addition, the relationship information acquisition unit 23 acquires, as the relationship information A2 indicating the relationship with the one or more second code blocks, the first code block which has the one or more second code blocks that perform the predetermined sensitive operation in the child node among the first code blocks and in which all of the one or more second code blocks can be traced from a normal control flow (in other words, all of the one or more second code blocks are included in a plurality of code blocks constituting the normal control flow). However, the relationship information acquisition unit 23 acquires the relationship information A2 about the first code block such as the dead code block or the code block that does not pass through the parser function (cannot be traced from the parser), and does not acquire the relationship information A2 about the first code block that does not pass through the code block having the authentication function that is passed through the normal control flow (hereinafter, the first code block is also simply referred to as a code block not passing through the authentication function).

Figure 8:
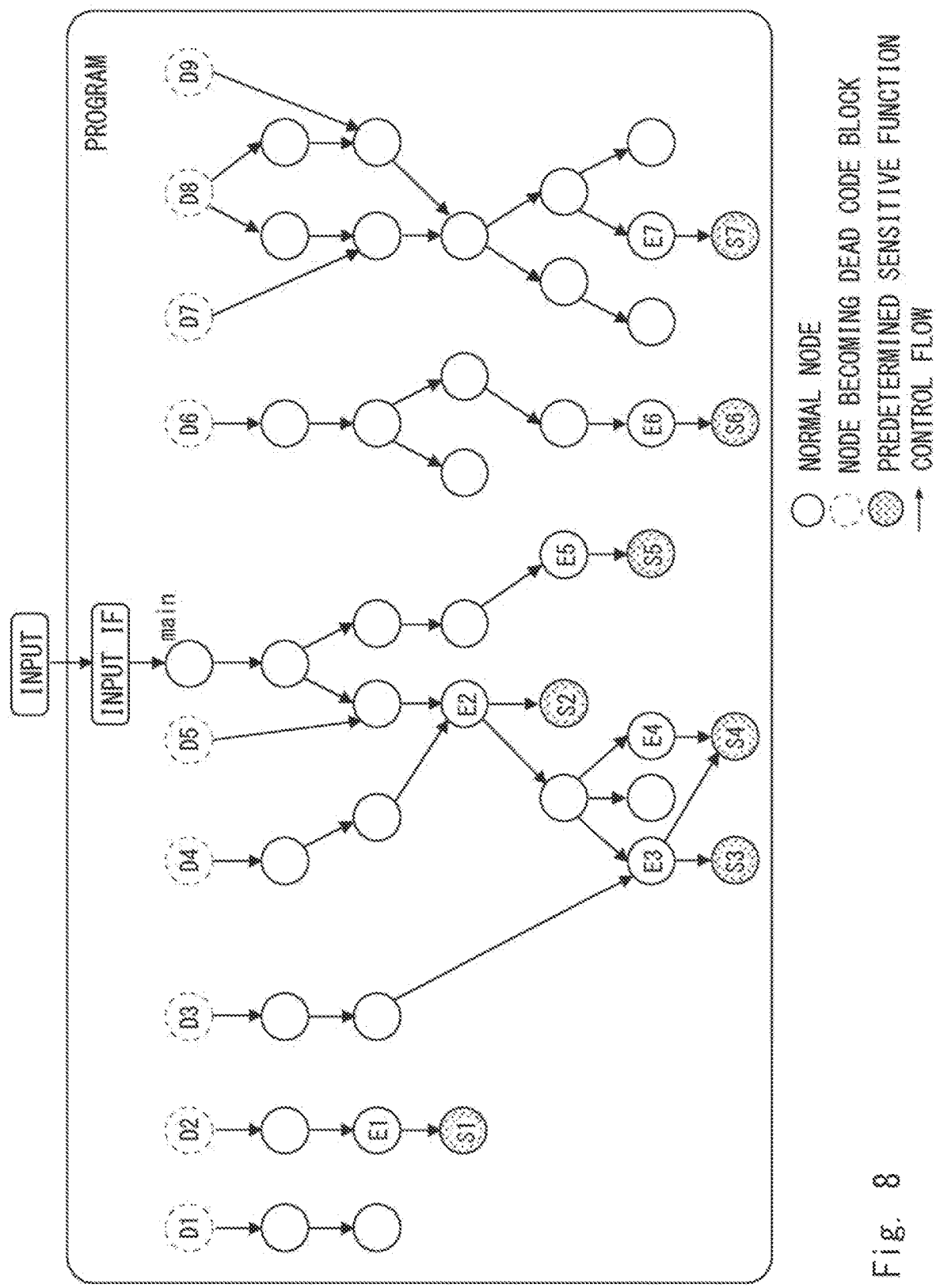
FIG. 8 is a schematic diagram illustrating an example of a control flow graph of a certain program for describing the relationship information acquired by the relationship information acquisition unit provided in the program analysis apparatus illustrated in FIG. 3.

FIG. 8 is a schematic diagram illustrating an example of a control flow graph of a certain program for describing the relationship information A1 and A2 acquired by the relationship information acquisition unit 23. In the example of FIG. 8, nine dead code blocks which are nodes having no parent node on the control flow graph are extracted as the first code blocks D1 to D9 to be scored. In addition, in the example of FIG. 8, seven code blocks which are nodes performing a predetermined sensitive operation are extracted as second code blocks E1 to E7. In the example of FIG. 8, it is assumed that the second code blocks E1 to E7 perform calling operations of predetermined sensitive functions S1 to S7, respectively.

Referring to FIG. 8, the relationship information acquisition unit 23 acquires the first code blocks D2 to D9 having at least one of the second code blocks E1 to E7 in the child node among the first code blocks D1 to D9 as the relationship information A1 that is information indicating a relationship with the second code blocks connected thereto. In addition, the relationship information acquisition unit 23 acquires the first code blocks D3 to D5 which has at least one of the second code blocks E1 to E7 in a child node among the first code blocks D1 to D9 and in which all the second code blocks having in the child node can be traced from a normal control flow (for example, a main function in the case of C language) as the relationship information A2 that is information indicating the relationship with the second code blocks connected thereto.

Note that the relationship information acquisition unit 23 is not limited to the case of acquiring the relationship information A1 and A2 described above, and may acquire any relationship information preset to the user as having a low possibility of being a back code.

For example, in a case where there are a predetermined number or more of first code blocks together having one or more second code blocks in the child node, the relationship information acquisition unit 23 may acquire the predetermined number or more of first code blocks as relationship information A3 which is information indicating a relationship with the one or more second code blocks. Here, the fact that the common second code block is reachable from a large number of first code blocks means that the common second code block is reachable by any user input or execution condition, and thus, there is a low possibility that these large number of first code blocks are backdoor codes.

Figure 9:
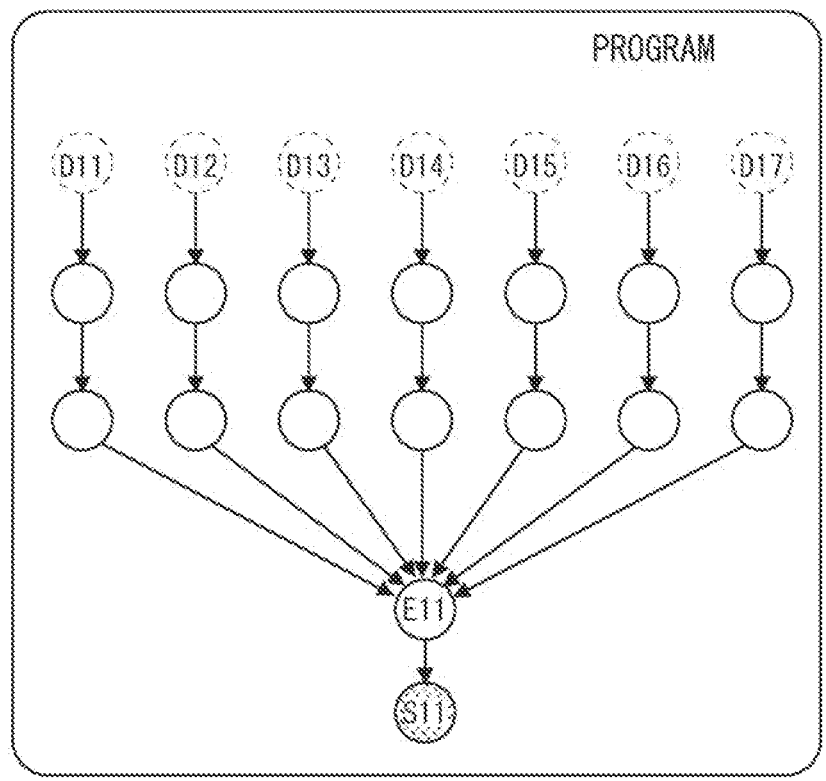
FIG. 9 is a schematic diagram illustrating an example of a control flow graph of a certain program for describing the relationship information acquired by the relationship information acquisition unit provided in the program analysis apparatus illustrated in FIG. 3.

FIG. 9 is a schematic diagram illustrating an example of a control flow graph of a certain program for describing the relationship information A3 acquired by the relationship information acquisition unit 23. In the example of FIG. 9, seven dead code blocks which are nodes having no parent node on the control flow graph are extracted as first code blocks D11 to D17 to be scored. In addition, in the example of FIG. 9, one code block which is a node performing a predetermined sensitive operation is extracted as a second code block E11. In the example of FIG. 9, it is assumed that the second code block E11 performs the calling operation of the predetermined sensitive function S11.

Referring to FIG. 9, when the predetermined number is 5, the number of first code blocks having the common second code block E11 in the child node is equal to or larger than the predetermined number. Therefore, the relationship information acquisition unit 23 acquires all of the predetermined number or more of first code blocks D11 to D17 having the common second code block E11 in the child node as the relationship information A3 that is information indicating the relationship with the second code block E11.

Figure 10:
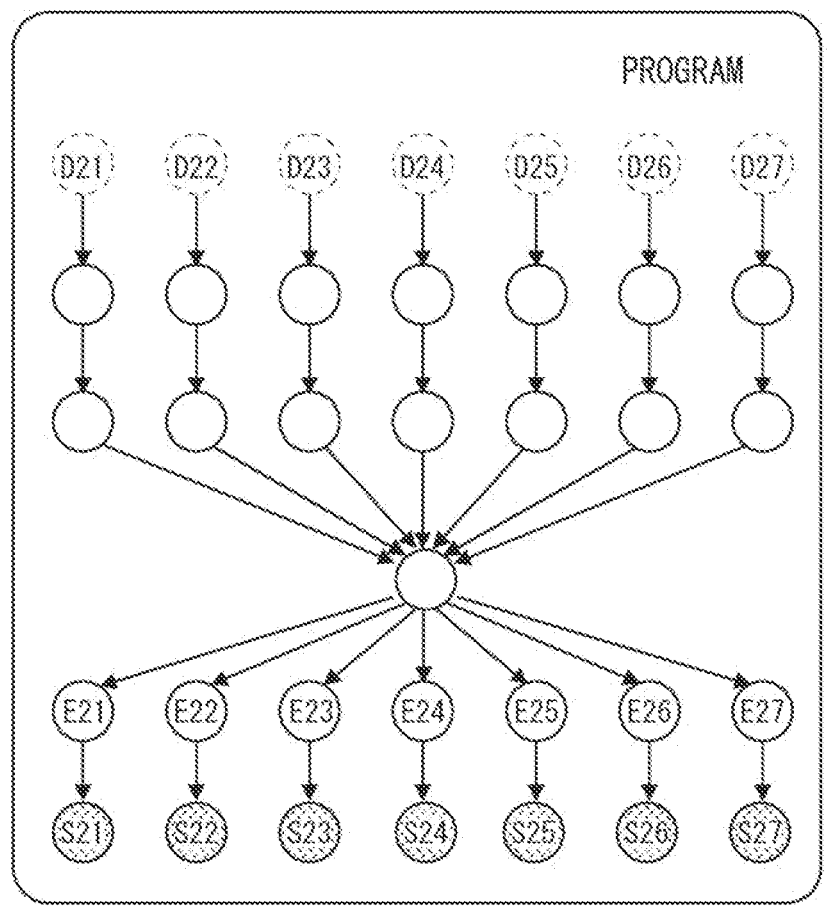
FIG. 10 is a schematic diagram illustrating an example of a control flow graph of a certain program for describing the relationship information acquired by the relationship information acquisition unit provided in the program analysis apparatus illustrated in FIG. 3.

FIG. 10 is a schematic diagram illustrating another example of a control flow graph of a certain program for describing the relationship information A3 acquired by the relationship information acquisition unit 23. In the example of FIG. 10, seven dead code blocks which are nodes having no parent node on the control flow graph are extracted as first code blocks D21 to D27 to be scored. In the example of FIG. 10, seven code blocks which are nodes performing a predetermined sensitive operation are extracted as second code blocks E21 to E27. In the example of FIG. 10, it is assumed that the second code blocks E21 to E27 perform calling operations of predetermined sensitive functions S21 to S27, respectively.

Referring to FIG. 10, when the predetermined number is 5, the number of first code blocks having the common second code blocks E21 to E27 in the child node is equal to or larger than the predetermined number. Therefore, the relationship information acquisition unit 23 acquires all of the predetermined number or more of first code blocks D21 to D27 having the common second code blocks E21 to E27 in the child node as the relationship information A3 which is information indicating the relationship with the second code blocks E21 to E27.

Furthermore, for example, the relationship information acquisition unit 23 may acquire, as relationship information A4 that is information indicating a relationship with one or more second code blocks, the first code block which does not pass through the code block having the authentication function that is passed through the normal control flow and has one or more second code blocks that perform a predetermined sensitive operation in the child node, and in which any one of the one or more second code blocks is the child node of the code block having the authentication function.

The backdoor score calculation unit 24 calculates the backdoor score for each first code block extracted by the first code block extraction unit 21 based on an operation content (predetermined sensitive operation) of the first code block.

More specifically, the backdoor score calculation unit 24 reads a score corresponding to the operation content of the first code block from the target operation table 26 for each first code block extracted by the first code block extraction unit 21, and adds the score to the backdoor score of the first code block.

Note that a plurality of combinations of target operations (predetermined sensitive operations) and scores corresponding thereto are registered in the target operation table 26. The target operation table 26 is not limited to the case of being provided inside the program analysis apparatus 20, and may be provided in a storage device or the like outside the program analysis apparatus 20.

Further, the backdoor score calculation unit 24 performs addition and subtraction of the backdoor score with respect to each first code block based on the relationship information acquired by the relationship information acquisition unit 23.

For example, in a case where the relationship information A1 is acquired by the relationship information acquisition unit 23, in other words, in a case where the first code block having one or more second code blocks for performing the predetermined sensitive operation in the child node is detected (acquired) by the relationship information acquisition unit 23, it is considered that there is a relatively high possibility that the detected first code block is the backdoor code. In this case, the backdoor score calculation unit 24 adds the score corresponding to the content of the predetermined sensitive operation included in the one or more second code blocks to the backdoor score for the detected first code block. Note that, as the score at this time, the score corresponding to the target operation registered in the target operation table 26 is used.

Furthermore, for example, in a case where the relationship information A2 described above is acquired by the relationship information acquisition unit 23, in other words, in a case where the relationship information acquisition unit 23 detects (acquires) the first code block which has one or more second code blocks that perform the predetermined sensitive operation in the child node and in which all of the one or more second code blocks can be traced from a normal control flow, there is a high possibility that the detected first code block is the dead code generated by inline conversion of the function associated with optimization of the program, and thus, there is a low possibility that the first code block is the backdoor code. In this case, for example, the backdoor score calculation unit 24 subtracts a predetermined score from the backdoor score for the detected first code block (alternatively, the score added by the acquisition of the relationship information A1 is subtracted). However, as described above, the first code block detected at this time does not include the code block that does not pass through the authentication function. Note that a score corresponding to the target operation registered in the target operation table 26 may be used as the score at this time.

Furthermore, for example, in a case where the above-described relationship information A3 is acquired by the relationship information acquisition unit 23, in other words, in a case where a predetermined number or more of first code blocks both having one or more second code blocks in the child node are detected (acquired), there is a low possibility that the detected first code block is the backdoor code. In this case, for example, the backdoor score calculation unit 24 subtracts a predetermined score from the backdoor score for the detected first code block (alternatively, the score added by the acquisition of the relationship information A1 is subtracted). Note that a score corresponding to the target operation registered in the target operation table 26 may be used as the score at this time.

Furthermore, for example, in a case where the relationship information A4 described above is acquired by the relationship information acquisition unit 23, in other words, in a case where the first code block is detected (acquired), which does not pass through the authentication function and has one or more second code blocks that perform the predetermined sensitive operation in the child nodes, and in which any one of the one or more second code blocks is the child node of the code block having the authentication function, it is considered that there is a relatively high possibility that the detected first code block is the backdoor code. In this case, for example, the backdoor score calculation unit 24 adds a predetermined score to the backdoor score for the detected first code block (alternatively, the subtraction of the score added by the acquisition of the relationship information A1 is not performed). Note that a score corresponding to the target operation registered in the target operation table 26 may be used as the score at this time.

The output unit 25 outputs the first code block extracted by the first code block extraction unit 21 and the backdoor score for the first code block calculated by the backdoor score calculation unit 24 as analysis results.

The output format of each first code block by the output unit 25 may be symbol information in the target binary, a relative address of the code block, a code block name named when the program is analyzed, or the like. In addition, the first code block may be output in a mode in which the backdoor score for the code block is assigned.

In the program analysis apparatus 20, it is assumed that a program to be analyzed is in a binary format and a binary of the program is input, but a source code may be used as an analysis target. In that case, the first code block extraction unit 21 may compile the source code to be analyzed and convert the source code into the binary format. In addition, the first code block extraction unit 21, the second code block extraction unit 22, the relationship information acquisition unit 23, the backdoor score calculation unit 24, or a processing unit (not illustrated) may appropriately use information obtained from the source code for analysis.

Figure 11:
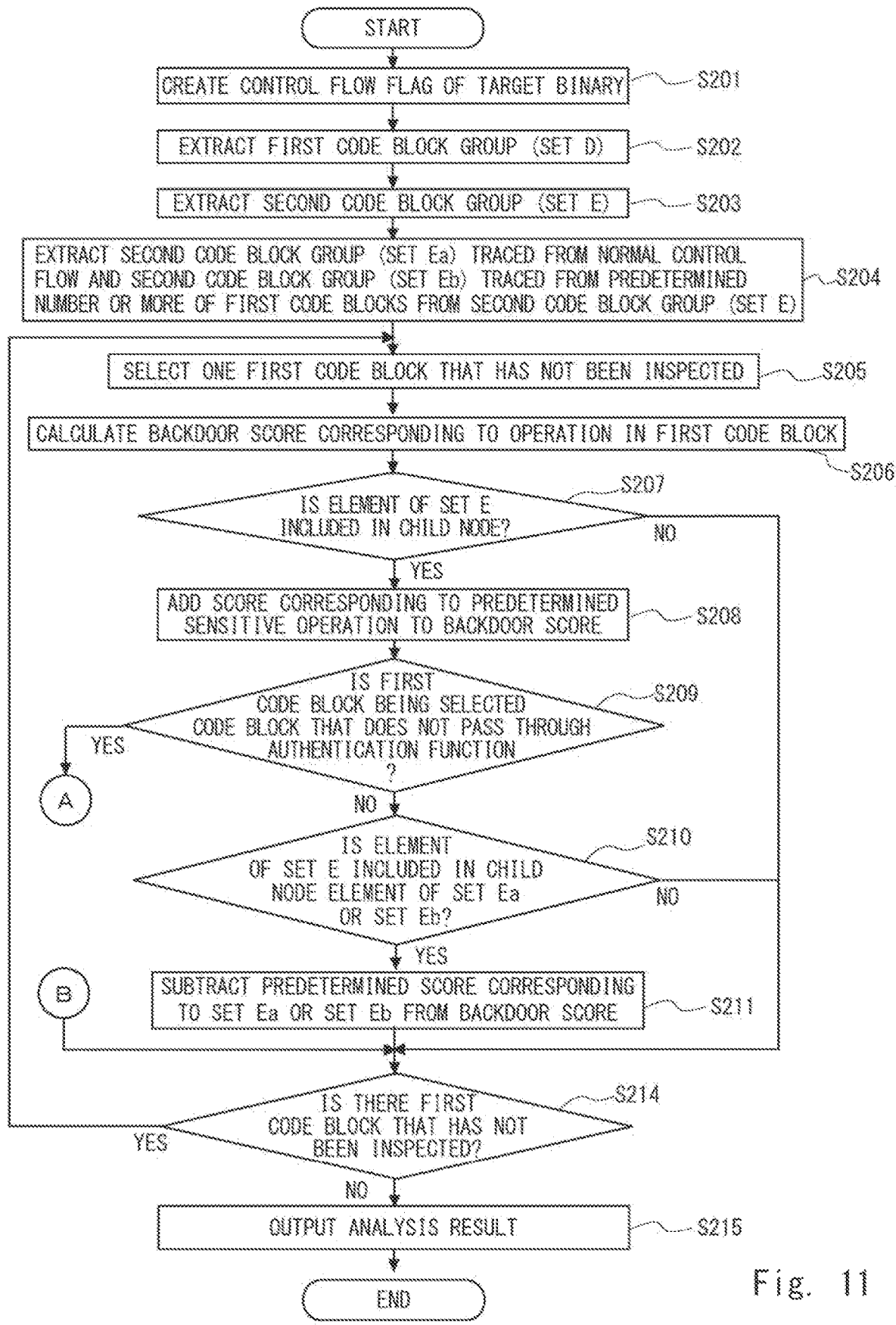
FIG. 11 is a flowchart illustrating an example of a flow of a process of a program analysis apparatus according to a second example embodiment.
Figure 12:
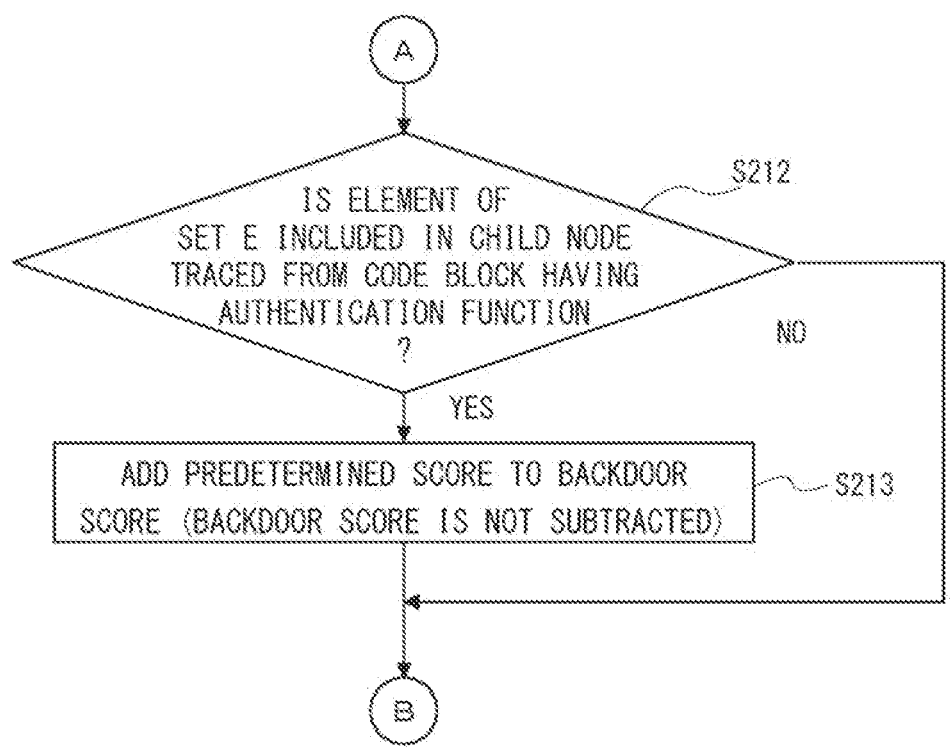
FIG. 12 is a flowchart illustrating an example of a flow of the process of the program analysis apparatus according to the second example embodiment.

Next, an example of a flow of a process of the program analysis apparatus 20 will be described with reference to FIGS. 11 and 12. FIGS. 11 and 12 are flowcharts illustrating an example of the flow of the process of the program analysis apparatus 20. Note that a symbol A in each of FIGS. 11 and 12 is connected, and a symbol B in each of FIGS. 11 and 12 is connected.

As illustrated in FIGS. 11 and 12, first, the first code block extraction unit 21 performs static analysis or the like on the target binary to create the control flow graph (Step S201). Thereafter, the first code block extraction unit 21 extracts all code block groups having specific properties as a first code block group (set D) from codes included in the target binary based on information such as the created control flow graph (Step S202).

Thereafter, the second code block extraction unit 22 extracts a code block group for performing a predetermined sensitive operation as a second code block group (set E) from the codes included in the target binary (Step S203).

At this time, the second code block extraction unit 22 extracts a second code block group (set Ea) traced from a normal control flow and a second code block group (set Eb) traced from all of the predetermined number or more of first code blocks included in the first code block group (set D) from the second code block group (set E) (Step S204).

Thereafter, the relationship information acquisition unit 23 acquires the relationship information indicating the relationship on the control flow between the first code block such as the dead code block and the second code block performing the predetermined sensitive operation. Thereafter, the backdoor score calculation unit 24 calculates the backdoor score for each first code block extracted by the first code block extraction unit 21 based on the operation content of the first code block. Further, the backdoor score calculation unit 24 performs addition and subtraction of the backdoor score with respect to each first code block based on the relationship information acquired by the relationship information acquisition unit 23.

A specific flow of the process by the relationship information acquisition unit 23 and the backdoor score calculation unit 24 is, for example, as follows.

First, one uninspected first code block is selected as the inspection target from the first code block group (set D) (Step S205). Thereafter, the backdoor score corresponding to operation content (content of predetermined sensitive operation) in the first code block to be inspected is calculated (Step S206).

At this time, it is determined whether the first code block to be inspected has an element of the set E in the child node (Step S207). That is, it is determined whether the first code block to be inspected has the second code block that performs a predetermined sensitive operation in the child node.

For example, in a case where the first code block to be inspected has an element of the set E in the child node (YES in Step S207), the score corresponding to the content of the predetermined sensitive operation is added to the backdoor score for the first code block to be inspected (Step S208). Meanwhile, in a case where the first code block to be inspected does not have the element of the set E in the child node (NO in Step S207), addition/subtraction of the backdoor score with respect to the first code block to be inspected is not performed.

At this time, it is determined whether the first code block to be inspected is the code block that does not pass through the authentication function (Step S209).

For example, in a case where the first code block to be inspected is not the code block that does not pass through the authentication function (NO in Step S209), that is, for example, in a case where the first code block is the dead code block or the code block that cannot be traced from the parser, a process in Step S210 is subsequently performed.

Specifically, it is determined whether the element of the set E included in the child node of the first code block to be inspected is the element of the set Ea or the set Eb (Step S210). That is, it is determined whether all of the second code blocks included in the child node of the first code block to be inspected can be traced from the normal control flow or from all of the predetermined number or more of first code blocks.

For example, in a case where the element of the set E included in the child node of the first code block to be inspected is an element of the set Ea or the set Eb (YES in Step S210), a predetermined score corresponding to the set Ea or a predetermined score corresponding to the set Eb is subtracted from the backdoor score for the first code block to be inspected (Step S211). Meanwhile, in a case where the element of the set E included in the child node of the first code block to be inspected is not any element of the set Ea and the set Eb (NO in Step S210), addition/subtraction of the backdoor score with respect to the first code block to be inspected is not performed.

In the process of Step S209, when the first code block to be inspected is the code block that does not pass through the authentication function (YES in Step S209), the process of Step S212 is subsequently performed.

Specifically, it is determined whether the element of the set E included in the child node of the first code block to be inspected is the element traced from the code block having an authentication function (Step S212). That is, it is determined whether any one of the second code blocks included in the child node of the first code block to be inspected can be traced from the code block having the authentication function (whether child node of the code block having the authentication function).

In a case where the element of the set E included in the child node of the first code block to be inspected is the element traced from the code block having the authentication function (YES in Step S212), a predetermined score is added to the backdoor score for the first code block to be inspected (Step S213). Meanwhile, when the element of the set E included in the child node of the first code block to be inspected is not the element traced from the code block having the authentication function (NO in Step S212), the backdoor score is not added to the first code block to be inspected.

Thus, the calculation of the backdoor score for the first code block to be inspected is completed.

Thereafter, when there remains the first code block that has not been inspected (YES in Step S214), one first code block that has not been inspected is selected as an inspection target (Step S205), and the processes of Steps S206 to S213 are performed. In a case where no uninspected first code block remains (NO in Step S214), each first code block and the backdoor score for the first code block are output from the output unit 25 as an analysis result (Step S215).

As described above, the program analysis apparatus 20 according to the present example embodiment can present the first code block that is a candidate for the backdoor code included in the program to be analyzed and the backdoor score for the first code block, for example, to the analyst of the program. As a result, the analyst of the program can extract a candidate for the backdoor code from the program without comparing the code of the program to be analyzed with the specification or manually checking the code of the program.

Here, the program analysis apparatus 20 according to the present example embodiment calculates the backdoor score for each first code block in consideration of the relationship on the control flow between the first code block which is the code block having the specific property and the second code block which is the code block performing the predetermined sensitive operation. As a result, the program analysis apparatus 10 can lower the backdoor score for the first code block that is apparently the dead code but is less likely to be the backdoor code, for example, as a result of the inline conversion of the function by the optimization of the program by the compiler. That is, the program analysis apparatus 20 can calculate the backdoor score with higher reliability for each first code block. As a result, the analyst of the program can accurately extract the code block having a high possibility of being the backdoor code from the program.

In addition, the user who is an analyst or the like can register the code block that is the candidate for the backdoor code and the operation that may be possessed by the child node in the target operation table 26 by himself/herself. Therefore, the user can determine which code block is extracted as a candidate for the backdoor code.

Third Example Embodiment

Figure 13:
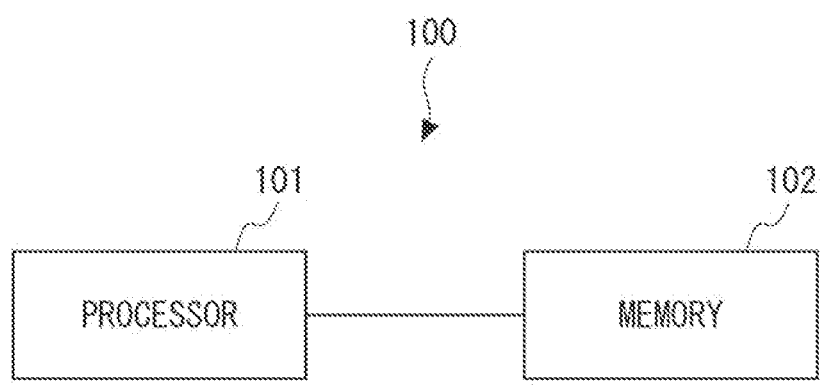
FIG. 13 is a diagram illustrating a hardware configuration example of a program analysis apparatus according to a third example embodiment.

FIG. 13 is a diagram illustrating a hardware configuration example of a program analysis apparatus 100 according to a third example embodiment. In FIG. 13, the program analysis apparatus 100 includes a processor 101 and a memory 102. The processor 101 may be, for example, a microprocessor, a micro processing unit (MPU), or a central processing unit (CPU). The processor 101 may include a plurality of processors. The memory 102 is configured by a combination of a volatile memory and a nonvolatile memory. The memory 102 may include a storage located away from the processor 101. In this case, the processor 101 may access the memory 102 through an input/output (I/O) interface (not illustrated).

The program analysis apparatus 10 according to the first example embodiment can have the hardware configuration illustrated in FIG. 13. In addition, the first code block extraction unit 11, the second code block extraction unit 12, the relationship information acquisition unit 13, the backdoor score calculation unit 14, and the output unit 15 in the program analysis apparatus 10 may be realized by the processor 101 reading and executing the program stored in the memory 102.

Similarly, the program analysis apparatus 20 according to the second example embodiment can have the hardware configuration illustrated in FIG. 13. In addition, the first code block extraction unit 21, the second code block extraction unit 22, the relationship information acquisition unit 23, the backdoor score calculation unit 24, and the output unit 25 in the program analysis apparatus may be realized by the processor 101 reading and executing the program stored in the memory 102. In addition, the target operation table 26 in the program analysis apparatus 20 may be stored in the memory 102.

The above-described program for realizing the program analysis apparatuses 10 and 20 can be stored using various types of non-transitory computer readable media and supplied to the computer. Examples of the non-transitory computer readable medium include a magnetic recording medium (for example, a flexible disk, a magnetic tape, or a hard disk drive), a magneto-optical recording medium (for example, a magneto-optical disk), a compact disc-read only memory (CD-ROM), a CD-recordable (CD-R), a CD-rewritable (CD-R/W), a semiconductor memory (for example, a mask ROM, a programmable ROM (PROM), an erasable PROM (EPROM), a flash ROM, and a random access memory (RAM)). Furthermore, the above-described program may be supplied to the computer by various types of transitory computer readable media. Examples of transitory computer-readable media include electrical signals, optical signals, and electromagnetic waves. The transitory computer readable medium can supply the program to the program analysis apparatuses 10 and 20 via a wired communication path such as an electric wire and an optical fiber or a wireless communication path.

Although the present disclosure has been described with reference to the example embodiments, the present disclosure is not limited to the example embodiments described above. Various modifications that can be understood by those skilled in the art can be made to the configuration and details of the present disclosure within the scope of the present disclosure.

Some or all of the above example embodiments may be described as the following supplementary notes, but are not limited to the following.

(Supplementary Note 1)

A program analysis apparatus including:

a first code block extraction means for extracting a first code block which is a code block having a specific property from codes included in a binary of a program;

a second code block extraction means for extracting a second code block which is a code block performing a predetermined sensitive operation from the codes included in the binary of the program;

a relationship information acquisition means for acquiring relationship information indicating a relationship on a control flow between the first code block and the second code block;

a backdoor score calculation means for calculating a backdoor score which is a score indicating a possibility that the first code block is a backdoor code or a score indicating a magnitude of an influence on a system when the first code block is executed based on content of the predetermined sensitive operation in the first code block, and performing addition and subtraction of the backdoor score with respect to the first code block based on the relationship information acquired by the relationship information acquisition means; and an output means for outputting the first code block extracted by the first code block extraction means and the backdoor score for the first code block calculated by the backdoor score calculation means.

(Supplementary Note 2)

The program analysis apparatus according to Supplementary Note 1, wherein when the relationship information acquisition means detects the first code block having one or more of the second code blocks which perform the predetermined sensitive operation in a child node, the backdoor score calculation means adds a score corresponding to content of the predetermined sensitive operation in the one or more second code blocks to a backdoor score of the detected first code block.

(Supplementary Note 3)

The program analysis apparatus according to Supplementary Note 2, wherein when the relationship information acquisition means detects a predetermined number or more of the first code blocks together having one or more of the second code blocks that perform the predetermined sensitive operation in the child node, the backdoor score calculation means subtracts a first predetermined score from a backdoor score of each of the detected predetermined number or more of first code blocks.

(Supplementary Note 4)

The program analysis apparatus according to Supplementary Note 2, wherein when the relationship information acquisition means detects the first code block which has one or more of the second code blocks which perform the predetermined sensitive operation in the child node and in which all of the one or more second code blocks are included in any of a plurality of code blocks constituting a normal control flow, the backdoor score calculation means subtracts a second predetermined score from the backdoor score of the detected first code block.

(Supplementary Note 5)

The program analysis apparatus according to any one of Supplementary Notes 1 to 4, wherein the first code block extraction means extracts a code block which cannot be reached by a normal control flow from codes included in the binary as the first code block which is a code block having the specific property when the program is executed.

(Supplementary Note 6)

The program analysis apparatus according to any one of Supplementary Notes 1 to 4, wherein the first code block extraction means extracts a code block not passing through a code block having a parser function that is passed through a normal control flow from codes included in the binary as the first code block which is a code block having the specific property when the program is executed.

(Supplementary Note 7)

The program analysis apparatus according to any one of Supplementary Notes 1 to 3, wherein the first code block extraction means extracts a code block not passing through a code block having an authentication function that is passed through a normal control flow from codes included in the binary as the first code block which is a code block having the specific property when the program is executed.

(Supplementary Note 8)

The program analysis apparatus according to Supplementary Note 2, wherein
  the first code block extraction means is configured to extract a code block not passing through a code block having an authentication function that is passed through a normal control flow from codes included in the binary as the first code block which is a code block having the specific property when the program is executed, and
  when the relationship information acquisition means detects a first code block which has one or more of the second code blocks which perform the predetermined sensitive operation in the child node and in which any one of the one or more second code blocks is a child node of a code block having an authentication function, the backdoor score calculation means adds a third predetermined score from the backdoor score of the detected first code block.

(Supplementary Note 9)

The program analysis apparatus according to any one of Supplementary Notes 1 to 8, wherein the predetermined sensitive operation is at least one of an operation of calling a predetermined function, an operation of accessing a predetermined variable, and an operation of executing a predetermined instruction, which are predetermined by a user.

(Supplementary Note 10)

The program analysis apparatus according to Supplementary Note 9, wherein the operation of calling the predetermined function includes an operation of calling at least one of a system call, a predetermined library function, and a predetermined application programming interface (API).

(Supplementary Note 11)

The program analysis apparatus according to Supplementary Note 9, wherein the operation of accessing the predetermined variable includes an operation of accessing a global variable of the program.

(Supplementary Note 12)

A program analysis method executed by a program analysis apparatus, the program analysis method including:

a first code block extraction step of extracting a first code block which is a code block having a specific property from codes included in a binary of a program;
  a second code block extraction step of extracting a second code block which is a code block performing a predetermined sensitive operation from the codes included in the binary of the program;
  a relationship information acquisition step of acquiring relationship information indicating a relationship on a control flow between the first code block and the second code block;
  a score calculation step of calculating a backdoor score which is a score indicating a possibility that the first code block is a backdoor code or a score indicating a magnitude of an influence on a system when the first code block is executed based on content of the predetermined sensitive operation in the first code block, and performing addition and subtraction of the backdoor score with respect to the first code block based on the acquired relationship information; and
  an output step of outputting the first code block extracted in the first code block extraction step and the backdoor score for the first code block calculated in the score calculation step.

(Supplementary Note 13)

A non-transitory computer readable medium storing a program for causing a computer to execute:

a first code block extraction process of extracting a first code block which is a code block having a specific property from codes included in a binary of a program;
  a second code block extraction process of extracting a second code block which is a code block performing a predetermined sensitive operation from the codes included in the binary of the program;
  a relationship information acquisition process of acquiring relationship information indicating a relationship on a control flow between the first code block and the second code block;
  a score calculation process of calculating a backdoor score which is a score indicating a possibility that the first code block is a backdoor code or a score indicating a magnitude of an influence on a system when the first code block is executed based on content of the predetermined sensitive operation in the first code block, and performing addition and subtraction of the backdoor score with respect to the first code block based on the acquired relationship information; and
  an output process of outputting the first code block extracted in the first code block extraction process and the backdoor score for the first code block calculated in the score calculation process.

REFERENCE SIGNS LIST

10 PROGRAM ANALYSIS APPARATUS
11 FIRST CODE BLOCK EXTRACTION UNIT
12 SECOND CODE BLOCK EXTRACTION UNIT
13 RELATIONSHIP INFORMATION ACQUISITION UNIT
14 BACKDOOR SCORE CALCULATION UNIT
15 OUTPUT UNIT
20 PROGRAM ANALYSIS APPARATUS
21 FIRST CODE BLOCK EXTRACTION UNIT
22 SECOND CODE BLOCK EXTRACTION UNIT
23 RELATIONSHIP INFORMATION ACQUISITION UNIT
24 BACKDOOR SCORE CALCULATION UNIT

25 OUTPUT UNIT
26 TARGET OPERATION TABLE
50 PROGRAM ANALYSIS APPARATUS
51 CODE BLOCK EXTRACTION UNIT
52 BACKDOOR SCORE CALCULATION UNIT
53 OUTPUT UNIT
100 PROGRAM ANALYSIS APPARATUS
101 PROCESSOR
102 MEMORY

What is claimed is:

1. A program analysis apparatus comprising:
at least one memory storing program instructions; and
at least one processor coupled to the at least one memory, the at least one processor being configured to execute the program instructions stored in the at least one memory to:
extract one or more first code blocks each of which is a code block having a specific property from codes included in a binary of a program;
extract one or more second code blocks each of which is a code block performing a predetermined sensitive operation from the codes included in the binary of the program;
acquire one or more pieces of relationship information indicating a relationship on a control flow between the one or more first code blocks and the one or more second code blocks;
calculate an initial backdoor score for each of the one or more first code blocks, which is a score indicating a possibility that the first code block is a backdoor code or a score indicating a magnitude of an influence on a system when the first code block is executed based on content of the predetermined sensitive operation in the first code block;
calculate an updated backdoor score for each of the one or more first code blocks by adding and/or subtracting from the initial backdoor score of each of the one or more first code blocks based on each of the one or more pieces of relationship information, wherein
 a score corresponding to content of the predetermined sensitive operation in the one or more second code blocks is added to the initial backdoor score of the respective first code block having one or more of the second code blocks which perform the predetermined sensitive operation in a child node in the calculation of the updated backdoor score, and
 a first predetermined score is subtracted from the initial backdoor score of each of a predetermined number or more of the one or more first code blocks together having one or more of the second code blocks that perform the predetermined sensitive operation in the child node in the calculation of the updated backdoor score;
determine, based on the updated backdoor score, that at least one of the one or more first code blocks is a backdoor code candidate; and
output, to a user, the backdoor code candidate, the updated backdoor score, a code block name and a relative address for the backdoor code candidate.

2. The program analysis apparatus according to claim 1, wherein in the extraction of the first code block, a code block which cannot be reached by a normal control flow is extracted from codes included in the binary as the first code block which is a code block having the specific property when the program is executed.

3. The program analysis apparatus according to claim 1, wherein in the extraction of the first code block, a code block not passing through a code block having a parser function that is passed through a normal control flow is extracted from codes included in the binary as the first code block which is a code block having the specific property when the program is executed.

4. The program analysis apparatus according to claim 1, wherein in the extraction of the first code block, a code block not passing through a code block having an authentication function that is passed through a normal control flow is extracted from codes included in the binary as the first code block which is a code block having the specific property when the program is executed.

5. The program analysis apparatus according to claim 1, wherein the predetermined sensitive operation is at least one of an operation of calling a predetermined function, an operation of accessing a predetermined variable, and an operation of executing a predetermined instruction, which are predetermined by a user.

6. The program analysis apparatus according to claim 5, wherein the operation of calling the predetermined function includes an operation of calling at least one of a system call, a predetermined library function, and a predetermined application programming interface (API).

7. The program analysis apparatus according to claim 5, wherein the operation of accessing the predetermined variable includes an operation of accessing a global variable of the program.

8. A program analysis apparatus comprising:
at least one memory storing program instructions; and
at least one processor coupled to the at least one memory, the at least one processor being configured to execute the program instructions stored in the at least one memory to:
extract one or more first code blocks each of which is a code block having a specific property from codes included in a binary of a program;
extract one or more second code blocks each of which is a code block performing a predetermined sensitive operation from the codes included in the binary of the program;
acquire one or more pieces of relationship information indicating a relationship on a control flow between the one or more first code blocks and the one or more second code blocks;
calculate an initial backdoor score for each of the one or more first code blocks, which is a score indicating a possibility that the first code block is a backdoor code or a score indicating a magnitude of an influence on a system when the first code block is executed based on content of the predetermined sensitive operation in the first code block;
calculate an updated backdoor score for each of the one or more first code blocks by adding and/or subtracting from the initial backdoor score of each of the one or more first code blocks based on each of the one or more pieces of relationship information, wherein
 a score corresponding to content of the predetermined sensitive operation in the one or more second code blocks is added to the initial backdoor score of the respective first code block having one or more of the second code blocks which perform the predetermined sensitive operation in a child node in the calculation of the updated backdoor score, and
 a second predetermined score is subtracted from the initial backdoor score of the respective first code block which has one or more of the second code blocks which perform the predetermined sensitive operation in the child node and in which all of the one or more second code blocks are included in any of a plurality of code blocks constituting a normal control flow in the calculation of the updated backdoor score;

determine, based on the updated backdoor score, that at least one of the one or more first code blocks is a backdoor code candidate; and output, to a user, the backdoor code candidate, the updated backdoor score, a code block name and a relative address for the backdoor code candidate.

9. A program analysis apparatus comprising:

at least one memory storing program instructions; and at least one processor coupled to the at least one memory, the at least one processor being configured to execute the program instructions stored in the at least one memory to:

extract one or more first code blocks each of which is a code block having a specific property from codes included in a binary of a program, wherein
in the extraction of the first code block, a code block not passing through a code block having an authentication function that is passed through a normal control flow is extracted from codes included in the binary as the first code block which is a code block having the specific property when the program is executed;

extract one or more second code blocks each of which is a code block performing a predetermined sensitive operation from the codes included in the binary of the program;

acquire one or more pieces of relationship information indicating a relationship on a control flow between the one or more first code blocks and the one or more second code blocks;

calculate an initial backdoor score for each of the one or more first code blocks, which is a score indicating a possibility that the first code block is a backdoor code or a score indicating a magnitude of an influence on a system when the first code block is executed based on content of the predetermined sensitive operation in the first code block;

calculate an updated backdoor score for each of the one or more first code blocks by adding and/or subtracting from the initial backdoor score of each of the one or more first code blocks based on each of the one or more pieces of relationship information, wherein
a score corresponding to content of the predetermined sensitive operation in the one or more second code blocks is added to the initial backdoor score of the respective first code block having one or more of the second code blocks which perform the predetermined sensitive operation in a child node in the calculation of the updated backdoor score, and a third predetermined score is added to the initial backdoor score of the each of the one or more first code blocks which has one or more of the second code blocks which perform the predetermined sensitive operation in the child node and in which any one of the one or more second code blocks is a child node of a code block having an authentication function in the calculation of the updated backdoor score;

determine, based on the updated backdoor score, that at least one of the one or more first code blocks is a backdoor code candidate; and output, to a user, the backdoor code candidate, the updated backdoor score, a code block name and a relative address for the backdoor code candidate.

* * * * *